March 26, 1957 J. J. KLEIN ET AL 2,786,790
LAMINATED FABRIC
Filed July 3, 1953
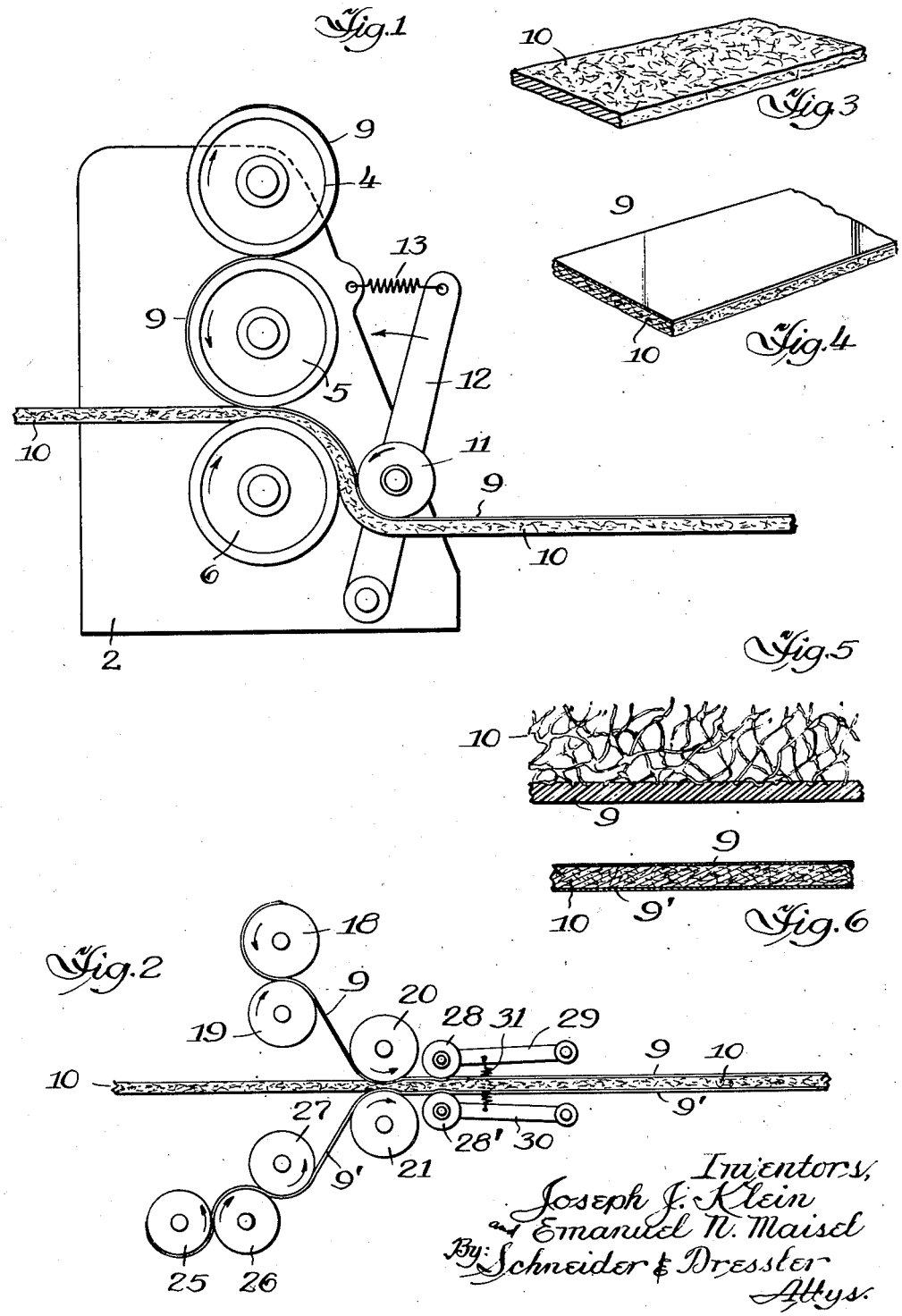
Inventors,
Joseph J. Klein
Emanuel N. Maisel
By: Schneider & Dresser
Attys.

United States Patent Office 2,786,790
Patented Mar. 26, 1957

2,786,790

LAMINATED FABRIC

Joseph J. Klein, Glencoe, and Emanuel N. Maisel, Aurora, Ill., assignors, by mesne assignments, to Fibre Bond Corporation, Chicago, Ill., a corporation of Illinois Application July 3, 1953, Serial No. 365,829

2 Claims. (Cl. 154—54)

This invention relates to laminated sheet having a fibrous base on a plastic backing sheet and to the method of making same.

Laminated sheets of the type with which the present invention is concerned are useful for automobile seat covers, and for covering chairs, tables, head boards of beds, and other articles of furniture to cushion them. The laminated sheet may be provided with plastic backing sheets on both sides of a base, with the edges of the plastic overlapped and joined to seal the fibrous base within the plastic, to form seat cushions, pads for play pens, beach mats, and similar articles.

Heretofore, laminated sheets for these and similar purposes have been formed by securing fibrous material as by flocking or a preformed fibrous batt to a plastic backing sheet by rubber latex, rubber cement, glue, nitrocellulose cement, phenol-aldehyde resinous adhesives, and other similar adhesives. The use of such adhesives causes the loss of some of the flexibility in the laminated sheet, and also adds to the expense of the finished product because of the time required for the adhesive to be applied and dried.

The laminated fabric of the present invention comprises a base which preferably is in the form of a batt in which synthetic fibers such as nylon, rayon, acrylic fiber (for example the copolymer of vinyl chloride and acrylonitrile sold under the trade-mark "Dynel"), etc. thinly coated with elastic adhesive, for example, natural or synthetic rubber, have a random, uncompressed, three-dimensional arrangement, with the coated fibers adhered preferably only in the immediate region of the spaced points of contact between the fibers, as described in the copending application of Emanuel N. Maisel, filed May 11, 1953 under Serial No. 354,003. More particularly said batt is an uncarded and uncompacted batt as described in said copending application of Emanuel N. Maisel, Serial Number 354,003, and comprises a plurality of normally uncompressed fibers, natural fibers or synthetic fibers of from about one-half to about two inches in length, in intermingled, random, three-dimensional arrangement throughout the length, width and depth of the batt, there being individual fibers extending transversely throughout the depth of the batt to opposite upper and lower surfaces thereof. A thin coating of a flexible adhesive about the fibers throughout the batt serves to bond the fibers at spaced points of contact between the fibers to leave intercommunicating voids in the batt which are free of adhesive and to provide a batt of substantially uniform resilience and loft.

The backing sheet may comprise a sheet or film of a thermoplastic resin which can be plasticized, such as polyvinyl chloride, a copolymer of polyvinyl chloride and polyvinyl acetate (for example that sold under trade name "Koroseal" by B. F. Goodrich Co.), polyethylene, polystyrene, nylon, or polyvinylidene chloride (for example that sold under trade name "Saran" by Dow Chemical Co.).

The resin in pellet or other comminuted form is calendered under heat and pressure into sheet or foil form on conventional calender rolls and while in a soft plastic state is pressed against the base, in which the fibers are prebonded, to anchor the fibers of the base into the backing sheet. The fibers of the base when of thermoplastic resinous material such as "Dynel" are slightly softened by the heat of the calender rolls and thereby caused to coalesce with the backing sheet.

The structure of two preferred illustrative embodiments of the laminated sheet embodying our invention and the calendering apparatus illustrating the method of making the laminated sheet are shown in the drawings, in which:

Fig. 1 is a side elevational view of calendering apparatus for applying a backing sheet to one side of a fibrous base;

Fig. 2 is a diagrammatic side elevation view of a calendering apparatus for applying a pair of backing sheets to opposite surfaces of a fibrous base;

Fig. 3 is a fragmentary detail perspective view of a batt of fibrous material to which a backing sheet is to be applied;

Fig. 4 is a view, similar to Fig. 3, after the backing sheet has been applied;

Fig. 5 is a fragmentary cross sectional view, on an enlarged scale, through the laminated sheet showing the interbonding of the fibers of the base and the backing sheet; and Fig. 6 is a fragmentary cross sectional view showing a batt to opposite surfaces of which backing sheets have been applied.

Referring to Fig. 1 of the drawings, the reference numeral 2 indicates a frame in which conventional calender rolls 4, 5 and 6 for sheeting plastic material are rotatably mounted. Rolls 4, 5 and 6 are disposed in vertical alignment with their peripheral surfaces in contact. Roll 4 rotates clockwise. The rolls are heated to between about 280° and 315° F. to cause resin particles which are applied to roll 4 to coalesce into a sheet or foil 9 which constitutes the backing sheet for the laminated sheet. The precise degree of heat applied to the rolls depends upon the specific thermoplastic resin used to form the film. The resin must be heated sufficiently to soften it so that it can be calendered (worked) into sheet form.

The backing sheet 9 passes around roll 4 and between the peripheral surfaces of rolls 4 and 5 which are spaced apart a distance equal to the desired thickness of the sheet or foil. The roll 5 is also heated and cooperates with roll 4 to squeeze the sheet or foil 9 to the desired thickness. The backing sheet 9 may be formed of any suitable thermoplastic resin, preferably one that can be plasticized, such as "Koroseal," "Saran," nylon, polyethylene, polystyrene, or polyvinyl chloride.

Roll 5 rotates counter-clockwise and carries the backing sheet between its peripheral surface and the peripheral surface of roll 6 which rotates clockwise. A compressible fibrous base 10 in batt form passes between the peripheral surfaces of rolls 5 and 6 in contact with the backing sheet 9. The space between rolls 5 and 6 is less than the overall thickness of the laminated sheet which is squeezed between these rolls as it passes to a take off roll 11. Roll 6 is also heated to assist in maintaining the backing sheet in a relatively soft, plastic state so that the fibers of base 10 adjacent the outer surface of the base adjacent the backing sheet are embedded into the surface of the backing sheet as the laminated structure passes between the bight of rolls 5 and 6. The fibers of base 10 if of plastic material are also softened by the heated rolls 5 and 6, so that the fibers adjacent the surface of the base coalesce with the backing sheet to form a substantially permanent bond on cooling of the laminated structure.

Although substantially any type of fibrous base may be adhered to a plastic backing sheet as hereinabove described, the base preferably used is the plastic fiber base described in the abovementioned application of E. N. Maisel, which includes a network of communicating, freely accessible interstices or voids throughout the base. The voids are bounded by a plurality of substantially uncompressed, non-absorbent fibers loosely assembled in random, three-dimensional arrangement, with the fibers lightly coated with an elastic adhesive which adheres them only in regions immediate their spaced points of contact. This base readily retains its loft or thickness, is self-supporting, and is easily handled. When compressed as in passing between the bight of rolls 5 and 6, it springs back to its original form.

The take off roll 11 is rotatably mounted on a lever 12 pivoted to frame 2 and urged towards roll 6 by a tension spring 13. The take off roll, which is not heated, maintains proper tension on the laminated sheet as it comes out of the calender rolls.

In Fig. 2 we have diagrammatically shown an apparatus for applying backing sheets 9 and 9' to opposite surfaces of a fibrous base 10. It will be understood that the apparatus again is conventional and is mounted in a suitable frame (not shown). The backing sheets and the fibrous base are the same in both embodiments. Backing sheet 9 applied to the upper surface of fibrous base 10 is formed by feeding the resin with plasticizer added from a hopper to the bight of a pair of heated calender rolls. Heated calender rolls 18 and 19 are rotatably mounted in similar manner to rolls 5 and 6 except that the space between rolls 18 and 19 is less than the space between rolls 5 and 6. Fibrous base 10 is not fed between rolls 18 and 19 but is fed between a pair of pressure rolls 20 and 21. Backing sheet 9 passes from roll 19 underneath roll 20 where it is pressed into intimate contact with the upper surface of fibrous base 10. Roll 20 rotates counterclockwise, and roll 21 rotates clockwise and passes backing sheet 9' into contact with the lower surface of fibrous base 10. Backing sheet 9' is formed by feeding resin and plasticizer from a hopper 22 into the bight 22' of a pair of oppositely rotating heated calender rolls 23 and 24 and is carried to pressure roll 21 by heated calender rolls 25, 26 and 27.

The laminated sheet passes from the pressure rolls 20 and 21 between another pair of oppositely disposed rolls 28 and 28' rotatably mounted respectively on levers 29 and 30, each of which is pivoted to a suitable support (not shown). A tension spring 31, secured at its opposite ends to levers 29 and 30, urges these levers toward each other to maintain equal tension on both surfaces of the laminated sheet.

In the embodiment having backing sheets applied to opposite surfaces of the fibrous base, the structure of the laminated sheet is the same insofar as the bonding of the backing sheets to the base is concerned. The backing sheets 9 and 9' may be wider than fibrous base 10 so that they will overlap opposite edges thereof. The overlapping edges of the backing sheet may conveniently be sealed together by heated pressure rolls to form a laminated sheet closed at its longitudinal edges.

Although we have described preferred embodiments of the invention in considerable detail, it will be understood that the description thereof is intended to be illustrative, rather than restrictive, as many details may be modified or changed without departing from the spirit or scope of the invention. Accordingly, we do not desire to be restricted to the exact details described.

We claim:

1. A laminated fabric consisting essentially of a plasticized thermoplastic backing sheet and a base having one surface in contact therewith, said base comprising a compressible batt which retains its loft and springs back to its original shape upon compression and release of said compression, said batt being uncarded and uncompacted and comprising a plurality of normally uncompressed non-absorbent fibers of from about one-half inch to two inches in length, in intermingled, random, three-dimensional arrangement throughout the length, width and depth of the batt, there being individual fibers extending transversely throughout the depth of the batt to opposite upper and lower surfaces thereof, a thin coating of a flexible adhesive about the fibers throughout the batt, said adhesive bonding the fibers of said batt at spaced points of contact between the fibers to leave intercommunicating voids free of adhesive between the fibers and provide a batt of substantially uniform resilience and loft, fibers of said batt being embedded in said backing sheet at the plasticized surface of said sheet in contact with said batt, with fiber ends extending below the surface of said backing sheet and with the contacting surface of said backing sheet maintaining its original planar surface, said embedded fiber ends anchoring the batt to said backing sheet.

2. A laminated fabric consisting essentially of a plasticized thermoplastic backing sheet on opposite sides of a base and a base having its upper and lower surfaces in contact therewith, said base comprising a compressible batt which retains its loft and springs back to its original shape upon compression and release of said compression, said batt being uncarded and uncompacted and comprising a plurality of normally uncompressed non-absorbent fibers of from about one-half inch to two inches in length, in intermingled, random, three-dimensional arrangement throughout the length, width and depth of the batt, there being individual fibers extending transversely throughout the depth of the batt to opposite upper and lower surfaces thereof, a thin coating of a flexible adhesive about the fibers throughout the batt, said adhesive bonding the fibers of said batt at spaced points of contact between the fibers to leave intercommunicating voids free of adhesive between the fibers and provide a batt of substantially uniform resilience and loft, fibers of said batt being embedded in said backing sheets at the plasticized surfaces of said sheets in contact with said batt, with fiber ends extending below the surfaces of said backing sheets and with the contacting surfaces of said backing sheets maintaining their original planar surfaces, said embedded fiber ends anchoring the batt to said backing sheets.

References Cited in the file of this patent

UNITED STATES PATENTS

| | | |
|---|---|---|
| 2,306,046 | Duggan et al. | Dec. 22, 1942 |
| 2,385,870 | Lashar et al. | Oct. 2, 1945 |
| 2,444,094 | Duggan | June 29, 1948 |
| 2,483,404 | Francis | Oct. 4, 1949 |
| 2,494,848 | Whitelegg | Jan. 17, 1950 |
| 2,531,594 | Abrahams | Nov. 28, 1950 |
| 2,537,126 | Francis | Jan. 9, 1951 |